(No Model.)
G. F. BROTT.
COTTON GIN.
No. 394,640. Patented Dec. 18, 1888.
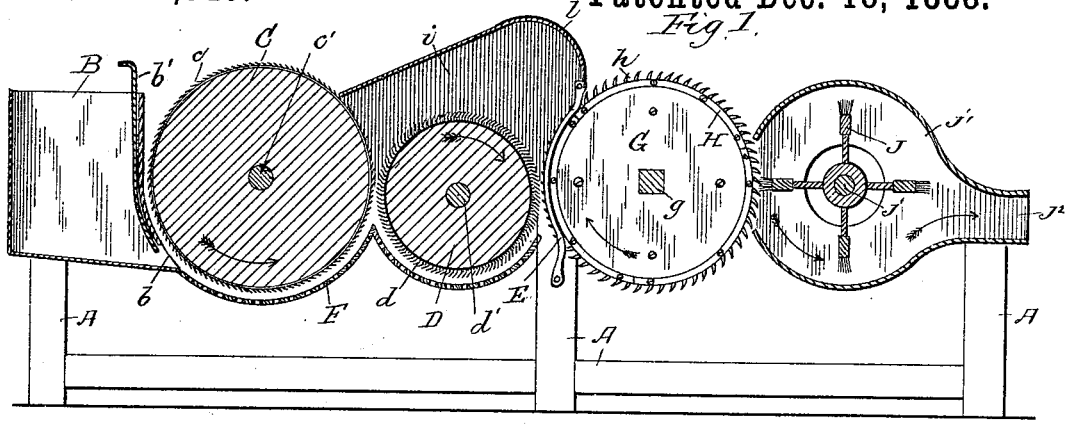
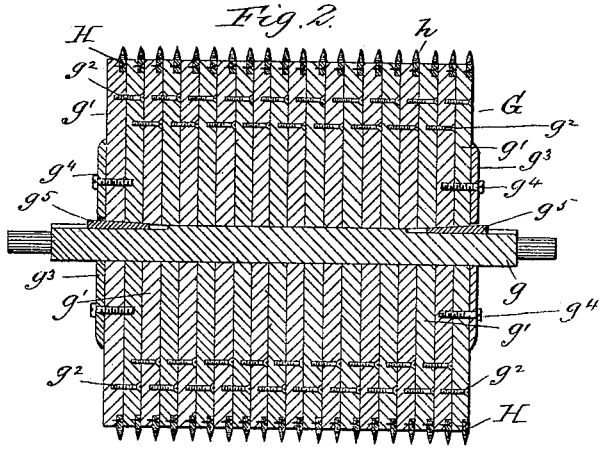
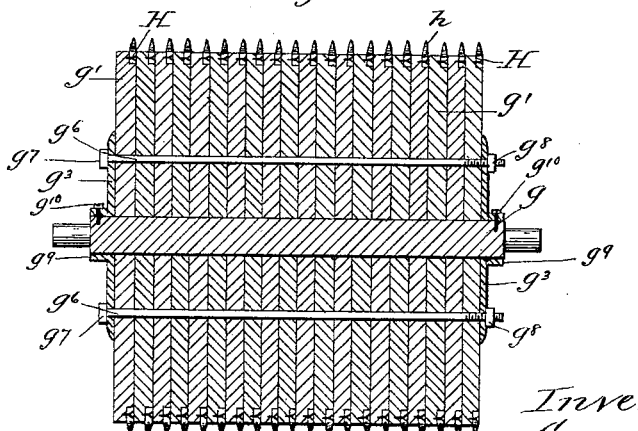
Witnesses:
J. R. Stuart
Parker W. Sweet
Inventor:
George F. Brott,
By Marble & Mason,
Attys

UNITED STATES PATENT OFFICE.

GEORGE F. BROTT, OF BLADENSBURG, MARYLAND.

COTTON-GIN.

SPECIFICATION forming part of Letters Patent No. 394,640, dated December 18, 1888.

Application filed February 18, 1888. Serial No. 264,533. (No model.)

*To all whom it may concern:*

Be it known that I, GEORGE F. BROTT, a citizen of the United States, residing at Bladensburg, in the county of Prince George's and State of Maryland, have invented certain new and useful Improvements in Cotton-Gins; and I do hereby declare the following to be a full, clear, and exact description of the invention, such as will enable others skilled in the art to which it appertains to make and use the same.

My invention relates generally to improvements in cotton-gins, and more particularly to the special construction of cotton-gin disclosed in Letters Patent No. 379,760, granted to me March 20, 1888; and it consists of the peculiar construction and arrangement or combination of parts which will be hereinafter fully disclosed in the description, drawings, and claims.

The object of my invention is to produce a cotton-gin that is peculiarly adapted for ginning seed-cotton and separating therefrom while undergoing the ginning process all hulls, twigs, dirt, and other foreign matter that may be present therein; a gin in which the cotton fiber is removed from the seed by a gradual combing or drawing action similar to that of carding; one which will not cut or otherwise injure the fiber, but will thoroughly separate the same from the seed; one which will gin long or short staple and dry or damp cotton with equal facility, and one which is cheaply manufactured and easily handled or operated. I attain this object by the mechanism herein described, and illustrated in the accompanying drawings, in which the same reference-letters indicate the same parts, and in which—

Figure 1 represents a longitudinal vertical section of a cotton-gin constructed in accordance with my invention; and Figs. 2 and 3, like views of my improved ginning-cylinder, Fig. 3 showing a modification of the same.

A represents the frame-work of the machine, which may be made of any desired form or size and material, and B represents the hopper, which is supported upon said frame-work and arranged at the side or in front of the feeding and carding cylinder C, and is provided with an outlet or feed opening, $b$, at a point below a line drawn horizontally through the center of said cylinder. This outlet or feed opening may be used in connection with a slide, $b'$, or any of the well-known adjustable devices for increasing or decreasing the size of hopper-openings, and thus regulate the supply of cotton to the feeding and carding cylinder.

The feeding and carding cylinder C, or, as I sometimes term it, the "feeding-brush," is a wooden roll clothed with short fine and sharp steel teeth $c$, which incline slightly forward, or in the direction of the rotation of the cylinder. They are arranged closely together, and thus prevent seed from entering and lodging between them; but they are sufficiently long (about one-sixteenth of an inch) to readily enter the fiber, straighten or comb it out, and loosen it upon the seed. This cylinder is horizontally arranged upon the shaft $c'$, which has suitable bearings on the frame-work of the machine.

D represents a revolving stripping-cylinder, which consists of a wooden roller clothed with fine yielding or flexible steel wires or teeth $d$, which are bent near their lower ends, so as to incline slightly in the direction of the rotation of the cylinder, as indicated by the arrow thereon. These steel wires or teeth are about one inch in length, which not only renders them flexible and prevents them from breaking the fiber, but permits them to readily enter and strip the cotton from the feeding and carding cylinder. This stripping-cylinder is also horizontally arranged and is supported upon a shaft, $d'$, which has suitable bearings on the frame-work of the machine; also, such speed is imparted to this cylinder as is necessary to brush or remove the combed out or straightened and loosened cotton from the feeding and carding cylinder C, which is also to be revolved at such speed as is necessary to supply the amount of cotton the machine is capable of ginning.

In rear of the stripping-cylinder D are arranged the ribs E, which may be of the ordinary kind or of the special construction disclosed in my above-named patent. They are secured to the frame-work of the machine and arranged side by side, as usual, so as to leave openings between them for the protrusion of the teeth of the ginning-rings.

F represents a perforated or slotted plate or a web of open mesh. Woven wire-cloth may be used, which is secured to the framework of the machine and so arranged beneath the feeding and carding and stripping cylinders C and D as to leave a limited space for the passage of the cotton between the same and said cylinders, the perforations or meshes therein permitting the discharge of seed and any dust, dirt, or other trash that may be mixed with the cotton.

G represents the ginning-cylinder, which is mounted on a square or other polygonally-shaped horizontal shaft, $g$, which also has suitable bearings on the frame-work of the machine. This cylinder is formed of a series of wooden disks, $g'$, having perfectly smooth or plain sides and circular peripheries. Through the center of each disk is formed a square or other polygonally-shaped opening adapted to snugly fit the correspondingly-shaped shaft $g$. Each disk is also rabbeted or rectangularly recessed on one side from its periphery inward for a distance about equal to half of the height of the body portions of the toothed ginning-rings H, which are fitted flush in said recesses and secured therein by means of screws, so as to be removable when desired. These toothed ginning-rings H are made of steel, of about one-sixteenth of an inch in width, are formed in three sections, and provided with teeth $h$, which are round, sharp-pointed, or tapering from base to point and slightly curved forward, or in the direction of rotation of the cylinder, as indicated by the arrow thereon.

When the wooden disks $g'$ and toothed ginning-rings H are constructed and secured together, as just stated, and it is desired to form a ginning-cylinder of any suitable length and diameter, it is made as follows: Two of the connected disks and rings are first secured together by wooden screws $g^2$, passed into the disks, after which other combined disks and rings, one at a time, are also secured to the two first-named disks and rings and to each other by wooden screws, this operation being continued until the desired length of cylinder is formed. To the end disks of the cylinder are attached circular metallic plates $g^3$ by means of bolts or screws $g^4$. These plates are formed with recesses or slots communicating with their central openings, and corresponding slots or grooves are formed in the shaft, and into these corresponding or registering slots are driven wedges or keys $g^5$ for firmly holding the cylinder upon its shaft.

A modified construction of my improved ginning-cylinder is illustrated in Fig. 3 of the drawings, in which the combined wooden disks and toothed ginning-rings are secured together by rods or bolts $g^6$, passing through openings formed in the metallic plates and wooden disks and extending from one end of the cylinder to the other, and provided at their respective ends with ordinary fixed heads, $g^7$, and adjusting-nuts $g^8$ for clamping and holding the parts named in fixed or operative position. In this construction of cylinder, instead of removably securing the same to the shaft by grooves or slots and keys, I provide the metallic plates $g^3$ around their central openings with collars or flanges $g^9$ and pass screws $g^{10}$ through the same and into the shaft. After the sectional toothed ginning-rings have been screwed into the recesses of the wooden disks, the latter may be secured together by the wooden screws $g^2$ or the long rods $g^6$, either before or after they are placed upon the shaft, a perfectly solid cylinder being formed in either case; also, as the polygonally-sided shaft passes through correspondingly-shaped openings in the centers of the wooden disks it will prevent the latter and their toothed ginning-rings from turning independently thereof. With either construction of the ginning-cylinder, should any of the wooden disks or ginning-rings become broken or injured they can be readily removed from their shaft, renewed or repaired, and replaced.

Above and adjacent to the ends of the stripping-cylinder are secured to the frame-work a curved top plate, $l$, and end plates, $i$, which constitute a "roll-box" for containing the roll of cotton and retaining it in shape. Any seed which may be carried forward with the cotton into this roll-box will be retained therein until they are completely stripped of lint or fiber by the ribs and ginning-cylinder; also, when stripped they, and also any mingled hulls and trash, are allowed to fall down along the ribs and pass out through the perforated or slotted plate F.

J represents the brush-fan, which may be of any ordinary or suitable construction. It is attached to the shaft $j$ and inclosed in the casing $j'$, and operates to remove the lint or fiber from the ginning-cylinder and discharge the same through the exit-opening $j^2$ to a condenser or into a lint-room.

The operation of my machine, excepting that which is obvious and hereinbefore described, is as follows: Any suitable motive power may be employed for imparting revolution to the shafts of the cylinders and brush-fan, said shafts being so belted or geared together that shafts $c'$ and $j$ revolve in one direction, while shafts $d'$ and $g$ revolve in the opposite direction, as indicated by the arrows, any usual or suitable differential speeds being imparted thereto. The seed-cotton being placed in the hopper B, is caught by the short, fine, and sharp teeth $c$ of the feeding and carding cylinder C, is carried beneath said cylinder and through the space between the same and the perforated or slotted plate F, and is thus distributed over the lower surface of said cylinder in a thin sheet or layer, the fine sharp teeth of the cylinder straightening or carding out the fiber and partially loosening or detaching the same from the seed. The thin layer of cotton partially removed from the seed and straightened out is then removed from the cylinder C by the stripping-cylinder D and carried up into the roll-box, where, assuming the form of a roll, it is revolved around by said stripping-cylinder and brought against the ribs E and the toothed ginning-rings H, which remove the previously-loosened fiber from the seed and permit the latter and any remaining foreign matter to fall down upon and through the perforated or slotted plate F. The fiber removed by the ginning-cylinder is carried around until it comes in contact with the brush-fan, which strips it from said cylinder and discharges the same into a lint-room or to a condenser, as usual.

The advantage of my present feeding and carding cylinder over the one disclosed in my above-referred-to patent will be readily understood and appreciated. The fine, sharp, and short teeth of the present cylinder will wear much longer than and are not so liable to become bent or broken as the fine yielding or flexible teeth of the former corresponding cylinder; also, the improvement or advantage in the present ginning-cylinder over that disclosed in my former patent resides in the fact that the sectional angle-irons with the sectional toothed ginning-rings attached to their sides and arranged wholly outside of the wooden roll are dispensed with as having certain disadvantages in practice, whereas my present corresponding cylinder is made up of a series of readily removable and replaceable wooden disks having the steel-toothed ginning-rings removably secured in recesses in their sides and extending outward from the circumference of the cylinder sufficiently far to pass between the ribs and detach the fiber from the seed; also, in practice I find better results produced by my present revolving stripping-cylinder, arranged as shown, than by my former stationary stripper, and, also, that the roll-box, constructed and arranged as shown, is a very important improvement on my former machine.

Having thus fully described the construction, arrangement, and operation of the parts of my invention, what I claim as new is—

1. In a cotton-gin, the combination of the feeding and carding cylinder clothed with short steel teeth, the hopper arranged in front of said cylinder and adapted to feed the cotton thereto below its horizontal center, the revolving stripping-cylinder arranged in proximity to the first-named cylinder, and the perforated or slotted plate arranged beneath said cylinders and having a space for the passage of the cotton, substantially as described.

2. In a cotton-gin, the combination of the hopper, the feeding and carding cylinder clothed with short, fine, and sharp steel teeth, the revolving stripping-cylinder clothed with long, fine, yielding or flexible steel teeth, and the perforated or slotted plate arranged beneath said cylinders, substantially as described.

3. In a cotton-gin, the combination of the hopper, the short-toothed feeding and carding cylinder, the yielding toothed revolving stripping-cylinder, the perforated plate, the roll-box arranged over said stripping-cylinder, the ribs, and the ginning-cylinder, substantially as described.

4. A cotton-ginning cylinder made up of a shaft, a series of wooden disks removably secured together upon said shaft and provided with recessed sides, and sectional ginning-rings removably secured within said recesses and provided with round tapering curved teeth, substantially as described.

5. A cotton-ginning cylinder constructed of a series of wooden disks having recessed sides, sectional toothed ginning-rings removably secured within said recesses, a shaft passing through said disks and holding them from revolving independently thereof, and devices for removably securing said disks together upon said shafts, substantially as described.

6. A cotton-gin cylinder constructed of a series of disks having recessed sides, sectional ginning-rings removably secured within said recesses and having round tapering slightly-curved teeth, metallic plates attached to the end disks of said cylinder and formed with central openings and recesses or slots communicating with said openings, a shaft passing through said disks and plates and preventing them from turning independently thereof and formed with slots or grooves registering with the recesses in said metallic plates, and wedges or keys for firmly holding the cylinder upon said shaft, substantially as described.

7. In a cotton-gin, the combination of the hopper, the feeding and carding cylinder, the stripping-cylinder, the roll-box, and the ribs, with the ginning-cylinder constructed of a series of wooden disks having recessed sides, sectional toothed ginning-rings removably secured within said recesses, a shaft passing through said disks and holding them from revolving independently thereof, and devices for removably securing said disks together upon said shaft, substantially as described.

In testimony whereof I affix my signature in presence of two witnesses.

GEORGE F. BROTT.

Witnesses:
E. L. WHITE,
ALBERT WOOD,